United States Patent [19]

Aoyama et al.

[11] Patent Number: 5,698,652
[45] Date of Patent: Dec. 16, 1997

[54] STYRENIC POLYMER AND MOLDED ARTICLE

[75] Inventors: Takuma Aoyama; Takaaki Uchida; Akitoshi Masuyama; Komei Yamasaki, all of Ichihara, Japan

[73] Assignee: Idemitsu Petrochemical Co., Ltd., Tokyo, Japan

[21] Appl. No.: 676,229

[22] PCT Filed: Nov. 27, 1995

[86] PCT No.: PCT/JP95/02402

§ 371 Date: Jul. 24, 1996

§ 102(e) Date: Jul. 24, 1996

[87] PCT Pub. No.: WO96/16997

PCT Pub. Date: Jun. 6, 1996

[30] Foreign Application Priority Data

Nov. 29, 1994 [JP] Japan ................................. 6-294469

[51] Int. Cl.$^6$ .................. C08F 212/04; C08F 112/04; C08F 12/04
[52] U.S. Cl. .................. 526/347; 526/133; 526/160; 526/340; 526/346; 526/347.1; 526/347.2; 528/499; 528/501
[58] Field of Search .................. 528/499, 501; 526/347, 346, 340, 347.2, 133, 160, 347.1

[56] References Cited

U.S. PATENT DOCUMENTS

| | | | |
|---|---|---|---|
| 5,006,296 | 4/1991 | Redersen | 264/176.1 X |
| 5,066,741 | 11/1991 | Campbell, Jr. | 526/347 X |
| 5,183,871 | 2/1993 | Yamasaki et al. | 526/346 X |
| 5,260,394 | 11/1993 | Tazaki et al. | 526/347 |
| 5,357,014 | 10/1994 | Uchida et al. | 526/346 X |
| 5,380,822 | 1/1995 | Skilbeck | 528/501 X |
| 5,468,823 | 11/1995 | Guerra et al. | 526/160 X |

FOREIGN PATENT DOCUMENTS

| | | |
|---|---|---|
| 3-059010 | 3/1991 | Japan. |
| 4-252207 | 9/1992 | Japan. |
| 5-295028 | 11/1993 | Japan. |
| 6-145214 | 5/1994 | Japan. |

*Primary Examiner*—Fred Teskin
*Attorney, Agent, or Firm*—Oblon, Spivak, McClelland, Maier & Neustadt, P.C.

[57] ABSTRACT

A styrenic polymer having a highly syndiotactic configuration (SPS) is herein disclosed in which the weight-average molecular weight of the styrenic polymer is in the range of $1 \times 10^4$ to $2 \times 10^6$ and in which the weight fraction of an extract extracted with methylene chloride from a gel obtained by dissolving the styrenic polymer in 1,2,4-trichlorobenzene and then cooling the solution is 10% by weight or less, and a molded article comprising the SPS is also disclosed.

3 Claims, No Drawings

STYRENIC POLYMER AND MOLDED ARTICLE

TECHNICAL FIELD

The present invention relates to a styrenic polymer and a molded article, and more specifically, it relates to a styrenic polymer having a syndiotactic configuration which is excellent in various characteristics such as breaking strength, impact resistance and heat resistance, and a molded article of this styrenic polymer.

BACKGROUND ART

It is already known that styrenic polymers having a syndiotactic configuration are excellent in mechanical strength, heat resistance, appearance and solvent resistance, and a variety of its uses have been expected. However, some of the styrenic polymers having the syndiotactic configuration obtained by known polymerization methods are poor in mechanical strength and heat resistance to be expected, and they are impracticable on occasion. The polymers having such a problem were investigated from various angles. That is to say, each of the styrenic polymers having the syndiotactic configuration was dissolved in 1,2,4-trichlorobenzene and then cooled to obtain a gel, and this gel was extracted with methylene chloride. In consequence, it has been found that as the amount of a methylene chloride extract increases, there occur the deterioration of the breaking strength of stretched films and the deterioration of the Izod impact strength, heat deformation temperature and breaking strength under long-term heating of injection-molded articles. In addition, it has also been found that when the molded articles of such polymers are intermittently or continuously used at a high temperature, the deterioration of the surface gloss of these molded articles occurs.

Accordingly, in order to further spread the uses of the styrenic polymers (hereinafter abbreviated to "SPS" sometimes) having the syndiotactic configuration by the utilization of characteristics peculiar to the styrenic polymers, the above-mentioned problems are required to be solved.

DISCLOSURE OF THE INVENTION

Objects of the present invention are to develop a styrenic polymer having a syndiotactic configuration which can decrease the amount of a methylene chloride extract from a gel obtained by cooling a 1,2,4-trichlorobenzene solution and which does not bring about the deterioration of the breaking strength of stretched films, the deterioration of Izod impact strength, heat deformation temperature and breaking strength under long-term heating of injection-molded articles, and the deterioration of the surface gloss of these molded articles by their intermittent or continuous use at a high temperature, and to develop a molded article of the above-mentioned styrenic polymer.

Now, the present inventors have intensively researched to solve the above-mentioned problems, and as a result, it has been found that a styrenic polymer having a syndiotactic configuration which is within a specific molecular weight range and in which the amount of a methylene chloride extract is 10% by weight or less can achieve the above-mentioned objects. In consequence, the present invention has been completed on the basis of such knowledge.

That is to say, the present invention provides a styrenic polymer having a highly syndiotactic configuration in which the weight-average molecular weight of the styrenic polymer is in the range of $1\times10^4$ to $2\times10^6$ and in which the weight fraction of an extract extracted with methylene chloride from a gel obtained by dissolving the styrenic polymer in 1,2,4-trichlorobenzene and then cooling the solution is 10% by weight or less, and a molded article comprising the above-mentioned polymer.

BEST MODE FOR CARRYING OUT THE INVENTION

A styrenic polymer of the present invention has a highly syndiotactic configuration, but here, the highly syndiotactic configuration means that its stereochemical structure has a highly syndiotactic configuration, i.e., a steric structure in which phenyl groups and substituted phenyl groups which are side chains are located alternately in opposite directions on a main chain comprising carbon-carbon bonds. Its tacticity can be quantitatively determined by a nuclear magnetic resonance method using an isotopic carbon (a $^{13}$C-NMR method). The tacticity which can be determined by the $^{13}$C-NMR method can be called as follows in accordance with the number of existing plural continuous constitutional units. For example, in the case that the continuous units are two, the tacticity is called a diad; in the case that the continuous units are three, it is called a triad; and in the case that the continuous units are five, it is called a pentad. The styrenic polymer having the highly syndiotactic configuration referred to in the present invention is a polystyrene, a poly(alkylstyrene), a poly(halogenated styrene), a poly(halogenated alkylstyrene), a poly(alkoxystyrene), a poly(vinyl benzoate), a hydrogenated polymer thereof, a mixture thereof or a copolymer mainly comprising any of the above-mentioned polymers in which the content of the syndiotacticity is preferably 75% or more, more preferably 85% or more in terms of a racemic diad, or it is preferably 30% or more, more preferably 50% or more in terms of a racemic pentad in the chain of styrenic repeating units. Here, examples of the poly(alkylstyrene) include poly(methylstyrene), poly(ethylstyrene), poly(isopropylstyrene), poly(tertbutylstyrene), poly(phenylstyrene), poly(vinylnaphthalene) and poly(vinylstyrene). Examples of the poly(halogenated styrene) include poly(chlorostyrene), poly(bromostyrene) and poly(fluorostyrene). An example of the poly(halogenated alkylstyrene) is poly(chloromethylstyrene), and examples of the poly(alkoxystyrene) include poly(methoxystyrene) and poly(ethoxystyrene). Furthermore, examples of a comonomer for the copolymer containing these constitutional units include olefinic monomers such as ethylene, propylene, butene, hexene and octene, diene monomers such as butadiene and isoprene, and polar vinyl monomers such as cyclic. olefinic monomers, cyclic diene monomers, methyl methacrylate, maleic anhydride and acrylonitrile, in addition to the monomer for the styrenic polymer. Of the above-mentioned styrenic polymers, the polystyrenes, the poly(alkylstyrenes), the poly(halogenated styrenes), hydrogenated polystyrenes and copolymers containing these constitutional units are particularly preferable.

The SPS which can be used in the present invention is required to have a weight-average molecular weight in the range of $1\times10^4$ to $2\times10^6$, and above all, a weight-average molecular weight of 50,000 or more is most preferable. If the weight-average molecular weight is less than $1\times10^4$, the strength of molded articles is inconveniently poor, and if it is more than $2\times10^6$, there is a problem that moldability deteriorates.

In this specification, the weight-average molecular weight can be measured by a gel permeation chromatography measuring method. That is to say, the molecular weights of the SPS are measured at 135° C. by the use of 1,2,4-trichlorobenzene as an eluting solution and GPC (Waters-150C) made by Millipore Co., Ltd. and GPC column (GMH6-HT) made by Toso Co., Ltd., and the measured molecular weights are then converted into the weight-average molecular weight by the utilization of a calibration curve of standard polystyrene.

Such an SPS may be manufactured by any of various methods, and for example, it can be manufactured by polymerizing a styrenic monomer (a monomer corresponding to the above-mentioned styrenic polymer) by the use of a catalyst for the polymerization mainly comprising a transition metal compound (a), a coordinated complex comprising a cation and an anion in which a plurality of groups are bonded to a metal, or an aluminoxane (b), and if necessary, an alkylating agent (c).

As the above-mentioned transition metal compound (a), various kinds of compounds can be used, but a Compound represented by the following general formula (1) or (2) can usually be used:

  (1)

  (2)

wherein M is a metal in the groups 3 to 6 of the periodic table or a lanthanum metal; $R^1$, $R^2$, $R^3$ and $R^4$ are each an alkyl group, an alkoxy group, an aryl group, a cyclopentadienyl group, an alkylthio group, a substituted cyclopentadienyl group, an indenyl group, a substituted indenyl group, a fluorenyl group, a halogen atom, an amino group or a chelating agent; a, b and c are each an integer of 0 to 4; d and e are each an integer of 0 to 3; and a complex in which any two of $R^1$ to $R^4$ are crosslinked via $CH_2$, $Si(CH_3)_2$ or the like is also acceptable.

As the metal in the groups 3 to 6 of the periodic table or the lanthanum metal represented by M, there can be used a metal in the group 4 of the periodic table, particularly titanium, zirconium or hafnium.

As titanium compounds, various kinds of compounds are usable, and for example, there can be used at least one kind of compound selected from the group consisting of titanium compounds and titanium chelate compounds represented by the general formulae (3) and (4)

  (3)

  (4)

wherein $R^5$, $R^6$, $R^7$ and $R^8$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, a substituted indenyl group, a fluorenyl group, an alkylthio group, an arylthio group, a chelating agent, an amino group or a halogen atom; a, b and c are each an integer of 0 to 4; d and e are each an integer of 0 to 3; and a complex in which any two of $R^5$ to $R^8$ are crosslinked via $CH_2$, $Si(CH_3)_2$ or the like is also acceptable.

$R^5$, $R^6$, $R^7$ and $R^8$ in the above-mentioned general formulae (3) and (4) are each a hydrogen atom, an alkyl group having 1 to 20 carbon atoms (concretely, a methyl group, an ethyl group, a propyl group, a butyl group, an amyl group, an isoamyl group, an isobutyl group, an octyl group, a 2-ethylhexyl group or the like), an alkoxy group having 1 to 20 carbon atoms (concretely, a methoxy group, an ethoxy group, a propoxy group, a butoxy group, an amyloxy group, a hexyloxy group, a 2-ethylhexyloxy group or the like), an aryl group having 6 to 20 carbon atoms, an alkylaryl group, an arylalkyl group (concretely, a phenyl group, a tolyl group, a xylyl group, a benzyl group or the like), an acyloxy group having 1 to 20 carbon atoms (concretely, a heptadecylcarbonyloxy group or the like), a cyclopentadienyl group, a substituted cyclopentadienyl group (concretely, a methylcyclopentadienyl group, a 1,2-dimethylcyclopentadienyl group, a pentamethylcyclopentadienyl group, a 4,5,6,7-tetrahydro-1,2,3-trimethylindenyl group or the like), an indenyl group, a substituted indenyl group (concretely, a methylindenyl group, a dimethylindenyl group, a tetramethylindenyl group, a hexamethylindenyl group or the like), a fluorenyl group (concretely, a methylfluorenyl group, a dimethylfluorenyl group, a tetramethylfluorenyl group, an octamethylfluorenyl group or the like), an alkylthio group (concretely, a methylthio group, an ethylthio group, a butylthio group, an amylthio group, an isoamylthio group, an isobutylthio group, an octylthio group, a 2-ethylhexylthio group or the like), an arylthio group (concretely, a phenylthio group, a p-methylphenylthio group or a p-methoxyphenylthio group), a chelating agent (concretely, a 2,2'-thiobis(4-methyl-6-t-butylphenyl) group or the like), or a halogen atom (concretely, chlorine, bromine, iodine or fluorine). $R^5$, $R^6$, $R^7$ and $R^8$ may be the same or different.

Furthermore, as the suitable titanium compound, there is a compound represented by the general formula (5)

TiRXYZ  (5)

wherein R is a cyclopentadienyl group, a substituted cyclopentadienyl group, an indenyl group, a substituted indenyl group or a fluorenyl group; and X, Y and X are each independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms, an alkyl or an arylamide group having 1 to 40 carbon atoms, or a halogen atom. Here, a compound in which one of X, Y and Z are crosslinked with R via $CH_2$, $SiR_2$ or the like is also acceptable. The substituted cyclopentadienyl group represented by R in this formula is a cyclopentadienyl group substituted by one or more alkyl groups having 1 to 6 carbon atoms, and typical examples of the substituted cyclopentadienyl group include a methylcyclopentadienyl group, a 1,2-dimethylcyclopentadienyl group, a 1,2,4-trimethylcyclopentadienyl group, a 1,2,3,4-tetramethylcyclopentadienyl group, a trimethylsilylcyclopentadienyl group, a 1,3-di(trimethylsilyl)cyclopentadienyl group, a tert-butylcyclopentadienyl group, a 1,3-di(tertbutyl)cyclopentadienyl group and a pentamethylcyclopentadienyl group. Furthermore, X, Y and Z are each independently a hydrogen atom, an alkyl group having 1 to 12 carbon atoms (concretely, a methyl group, an ethyl group, a propyl group, an n-butyl group, an isobutyl group, an amyl group, an isoamyl group, an octyl group, a 2-ethylhexyl group or the like), an alkoxy group having 1 to 12 carbon atoms (concretely, a methoxyl group, an ethoxyl group, a propoxyl group, a butoxyl group, an amyloxy group, a hexyloxy group, an octyloxy group, a 2-ethylhexyloxy group or the like), an aryl group having 6 to 20 carbon atoms (concretely, a phenyl group, a naphthyl group or the like), an aryloxy group having 6 to 20 carbon atoms (concretely, a phenoxy group or the like), an arylalkyl group having 6 to 20 carbon atoms (concretely, a benzyl group or the like), an alkyl or an arylamide group having 1 to 40 carbon atoms (concretely, a dimethylamide group, a diethylamide group, a diphenylamide group, a methylphenylamide group or the like), or a halogen atom (concretely, chlorine, bromine, iodine or fluorine).

Typical examples of the titanium compound represented by the general formula (5) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienyltrimethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethyltitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, (t-butylamido)dimethyl (tetramethyl$\eta^5$-cyclopentadienyl)silanetitanium dichloride, (t-butylamido)dimethyl(tetramethyl$\eta^5$-cyclopentadienyl)silanetitaniumdimethyl and (t-butylamido)dimethyl (tetramethyl$\eta^5$-cyclopentadienyl)silanetitaniumdimethoxy.

Of these titanium compounds, the compounds not containing any halogen atom are preferable, and particularly, the compounds each having one π-electron-containing ligand are preferable, as described above.

In addition, condensed titanium compounds represented by the general formula (6) may also be used as the titanium compounds:

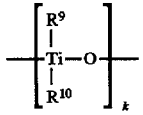

(6)

wherein $R^9$ and $R^{10}$ are each a halogen atom, an alkoxy group having 1 to 20 carbon atoms, or an acyloxy group; and k is a value of 2 to 20. Moreover, the above-mentioned titanium compound may be used in the form of a complex with an ester or an ether.

Typical examples of the trivalent titanium compound represented by the general formula (6) include a titanium trihalide such as titanium trichloride, a cyclopentadienyltitanium compound such as cyclopentadienyltitanium dichloride, and compounds obtained by reducing tetravalent titanium compounds. These trivalent titanium compounds may be used in the form of a complex with an ester or an ether.

Examples of a zirconium compound as the transition metal compound include tetrabenzylzirconium, zirconium tetraethoxide, zirconium tetrabutoxide, bisindenylzirconium dichloride, triisopropoxyzirconium chloride, zirconiumbenzyl dichloride and tributoxyzirconium chloride. Examples of a hafnium compound include tetrabenzylhafnium, hafnium tetraethoxide and hafnium tetrabutoxide. Additionally, examples of a vanadium compound include vanadyl bisacetylacetonate, vanadyl triacetylacetonate, triethoxyvanadyl and tripropoxyvanadyl. Among these transition metal compounds, the titanium compounds are particularly preferable.

As another transition metal compound which is the component (a), there is at least one compound selected from the group consisting of transition metal compounds having two conjugated π-electron-containing ligands, for example, transition metal compounds represented by the general formula (7)

$$M^1R^{11}R^{12}R^{13}R^{14} \qquad (7)$$

wherein $M^1$ is titanium, zirconium or hafnium; $R^{11}$ and $R^{12}$ are each a cyclopentadienyl group, a substituted cyclopentadienyl group, an indenyl group or a fluorenyl group; $R^{13}$ and $R^{14}$ are each a hydrogen atom, a halogen atom, a hydrocarbon group having 1 to 20 carbon atoms, an alkoxy group having 1 to 20 carbon atoms, an amino group or a thioalkoxy group having 1 to 20 carbon atoms; but $R^{11}$ and $R^{12}$ may be crosslinked via a hydrocarbon group having 1 to 5 carbon atoms, an alkylsilyl group having 1 to 20 carbon atoms and 1 to 5 silicon atoms, or a germanium-containing hydrocarbon group having 1 to 20 carbon atoms and 1 to 5 germanium atoms.

$R^{11}$ and $R^{12}$ in the above-mentioned general formula (7) are each a cyclopentadienyl group, a substituted cyclopentadienyl group (concretely, a methylcyclopentadienyl group, a 1,3-dimethylcyclopentadienyl group, a 1,2,4-trimethylcyclopentadienyl group, a 1,2,3,4-tetramethylcyclopentadienyl group, a pentamethylcyclopentadienyl group, a trimethylsilylcyclopentadienyl group, a 1,3-di(trimethylsilyl)cyclopentadienyl group, a 1,2,4-tri (trimethylsilyl)cyclopentadienyl group, a tert-butylcyclopentadienyl group, a 1,3-di(tert-butyl) cyclopentadienyl group or a 1,2,4-tri(tert-butyl) cyclopentadienyl group), an indenyl group, a substituted indenyl group (concretely, a methylindenyl group, a dimethylindenyl group or a trimethylindenyl group), a fluorenyl group or a substituted fluorenyl group (e.g., a methylfluorenyl group), and $R^{11}$ and $R^{12}$ may be the same or different. Furthermore, $R^{11}$ and $R^{12}$ may be crosslinked via an alkylidene group having 1 to 5 carbon atoms (concretely, a methylene group, an ethylidene group, a propylidene group, a dimethylcarbyl group or the like), or an alkylsilyl group having 1 to 20 carbon atoms and 1 to 5 silicon atoms (concretely, a dimethylsilyl group, a diethylsilyl group or a dibenzylsilyl group). On the other hand, $R^{13}$ and $R^{14}$ are defined above, but more specifically, $R^{13}$ and $R^{14}$ are each independently a hydrogen atom, an alkyl group having 1 to 20 carbon atoms (concretely, a methyl group, an ethyl group, a propyl group, an n-butyl group, an isobutyl group, an amyl group, an isoamyl group, an octyl group, a 2-ethylhexyl group or the like), an aryl group having 6 to 20 carbon atoms (concretely, a phenyl group, a naphthyl group or the like), an arylalkyl group having 7 to 20 carbon atoms (concretely, a benzyl group or the like), an alkoxy group having 1 to 12 carbon atoms (concretely, a methoxyl group, an ethoxyl group, a propoxyl group, a butoxyl group, an amyloxy group, a hexyloxy group, an octyloxy group, a 2-ethylhexyloxy group or the like), an aryloxy group having 6 to 20 carbon atoms (concretely, a phenoxy group or the like), an amino group or a thioalkoxy group having 1 to 20 carbon atoms.

Typical examples of the transition metal compound represented by the general formula (7) include biscyclopentadienyltitaniumdimethyl, biscyclopetadienyltitaniumdiethyl, biscyclopentadienyltitaniumdipropyl, biscyclopentadienyltitaniumdibutyl, bis(methylcyclopentadienyl)titaniumdimethyl, bis(tert-butylcyclopentadienyl)titaniumdimethyl, bis(1,3-dimethylcyclopentadienyl)titaniumdimethyl, bis(1,3-ditert-butylcyclopentadienyl)titaniumdimethyl, bis(1,2,4-trimethylcyclopentadienyl)titaniumdimethyl, bis(1,2,3,4-tetramethylcyclopentadienyl)titaniumdimethyl, biscyclopetandienyltitaniumdimethyl, bis(trimethylsilylcyclopentadienyl)titaniumdimethyl, bis(1,3-di(trimethylsilyl)cyclopentadienyl)titaniumdimethyl, bis(1,2,4-tri((trimethylsilyl)cyclopentadienyl)titaniumdimethyl, bisindenyltitaniumdimethyl, bisfluorenyltitaniumdimethyl, methylenebiscyclopentadienyltitaniumdimethyl, ethylidenebiscyclopentadienyltitaniumdimethyl, methylenebis(2,3,4,5-tetramethylcyclopentadienyl)titaniumdimethyl, ethylidenebis(2,3,4,5-tetramethylcyclopentadienyl)titaniumdimethyl, dimethylsilylbis(2,3,4,5-tetramethylcyclopentadienyl)titaniumdimethyl, methylenebisindenyltitaniumdimethyl, ethylidenebisindenyltitaniumdimethyl, dimethylsilylbisindenyltitaniumdimethyl, methylenebisfluorenyltitaniumdimethyl, ethylidenebisfluorenyltitaniumdimethyl, dimethylsilylbisfluorenyltitaniumdimethyl, methylene(tert-butylcyclopentadienyl)(cyclopentadienyl)titaniumdimethyl, methylene(cyclopentadienyl)(indenyl)titaniumdimethyl, ethylidene(cyclopentadienyl)(indenyl)titaniumdimethyl, dimethylsilyl(cyclopentadienyl)(indenyl)titaniumdimethyl, methylene(cyclopentadienyl)(fluorenyl)titaniumdimethyl, ethylidene(cyclopentadienyl)(fluorenyl)titaniumdimethyl, dimethylsilyl(cyclopentadienyl)(fluorenyl) titaniumdimethyl, methylene(indenyl)(fluorenyl) titaniumdimethyl, ethylidene(indenyl)(fluorenyl) titaniumdimethyl, dimethylsilyl(indenyl)(fluorenyl) titainumdimethyl, biscyclopentadienyltitaniumdibenzyl, bis(tert-butylcyclopentadienyl)titaniumdibenzyl, bis(methylcyclopentadienyl)titaniumdibenzyl, bis(1,3-dimethylcyclopentadienyl)titaniumdibenzyl, bis(1,2,4-trimethylcyclopentadienyl)titaniumdibenzyl, bis(1,2,3,4-tetramethylcyclopentadienyl)titaniumdibenzyl, bispentamethylcyclopentadienyltitaniumdibenzyl, bis(trimethylsilylcyclopentadienyl)titaniumdibenzyl, bis(1,3-di-(trimethylsilyl)cyclopentadienyl)titaniumdibenzyl, bis(1,2,4-tri(trimethylsilyl)cyclopentadienyl)titaniumdibenzyl, bisindenyltitaniumdibenzyl, bisfluorenyltitaniumdibenzyl, methylenebiscyclopentadienyltitaniumdibenzyl, ethylidenebiscyclopentadienyltitaniumdibenzyl, methylenebis(2,3,4,5-tetramethylcyclopentadienyl)titaniumdibenzyl, ethylidenebis(2,3,4,5-tetramethylcyclopentadienyl)titaniumdibenzyl, dimethylsilylbis(2,3,4,5-tetramethylcyclopentadienyl)titaniumdibenzyl, methylenebisindenyltitaniumdibenzyl, ethylidenebisindenyltitaniumdibenzyl, dimethylsilylbisindenyltitaniumdibenzyl, methylenebisfluorenyltitaniumdibenzyl, ethylidenebisfluorenyltitaniumdibenzyl, dimethylsilylbisfluorenyltitaniumdibenzyl, methylene(cyclopentadienyl)(indenyl)titaniumdibenzyl, ethylidene(cyclopentadienyl)(indenyl)titaniumdibenzyl, dimethylsilyl(cyclopentadienyl)(indenyl)titaniumdibenzyl, methylene(cyclopentadienyl)(fluorenyl)titaniumdibenzyl, ethylidene(cyclopentadienyl)(fluorenyl)titaniumdibenzyl, dimethylsilyl(cyclopentadienyl)(fluorenyl)titaniumdibenzyl, methylene(indenyl)(fluorenyl)titaniumdibenzyl, ethylidene(indenyl)(fluorenyl)titaniumdibenzyl, dimethylsilyl(indenyl)(fluorenyl)titaniumdibenzyl, biscyclopentadienyltitanium dimethoxide, biscyclopentadienyltitanium diethoxide, biscyclopentadienyltitanium dipropoxide, biscyclopentadienyltitanium dibutoxide, biscyclopentadienyltitanium diphenoxide, bis(methylcyclopentadienyl)titanium dimethoxide, bis(1,3-dimethylcyclopetandienyl)titanium dimethoxide, bis(1,2,4-trimethylcyclopentadienyl)titanium dimethoxide, bis(1,2,3,4-tetramethylcyclopentadienyl)titanium dimethoxide, bispentamethylcyclopentadienyltitanium dimethoxide, bis(trimethylsilylcyclopentadienyl)titanium dimethoxide, bis(1,3-di(trimethylsilyl)cyclopentadienyl)titanium dimethoxide, bis(1,2,4-tri(trimethylsilyl)cyclopentadienyl)titanium dimethoxide, bisindenyltitanium dimethoxide, bisfluorenyltitanium dimethoxide, methylenebiscyclopentadienyltitanium dimethoxide, ethylidenebiscyclopentadienyltitanium dimethoxide, methylenebis(2,3,4,5-tetramethylcyclopentadienyl)titanium dimethoxide, ethylidenebis(2,3,4,5-tetramethylcyclopentadienyl)titanium dimethoxide, dimethylsilylbis(2,3,4,5-tetramethylcyclopentadienyl) titanium dimethoxide, methylenebisindenyltitanium dimethoxide, methylenebis(methylindenyl)titanium dimethoxide, ethylidenebisindenyltitainum dimethoxide, dimethylsilylbisindenyltitanium dimethoxide, methylenebisfluorenyltitanium dimethoxide, methylenebis(methylfluorenyl)titanium dimethoxide, ethylidenebisfluorenyltitanium dimethoxide, dimethylsilylbisfluorenyltitanium dimethoxide, methylene(cyclopetadienyl)(indenyl)titanium dimethoxide, ethylidene(cyclopentadienyl)(indenyl)titanium dimethoxide, dimethylsilyl(cycloptentadienyl)(indenyl)titanium dimethoxide, methylene(cyclopentadienyl)(fluorenyl)titanium dimethoxide, ethylidene(cyclopentadienyl)(fluorenyl)titanium dimethoxide, dimethylsilyl(cyclopentadienyl)(fluorenyl)titanium dimethoxide, methylene(indenyl)(fluorenyl)titanium dimethoxide, ethylidene(indenyl)(fluorenyl)titanium dimethoxide and dimethylsilyl(indenyl)(fluorenyl)titanium dimethoxide.

Furthermore, examples of the zirconium compound include ethylidenebiscyclopentadienylzirconium dimethoxide and dimethylsilylbiscyclopentadienylzirconium dimethoxide, and examples of the hafnium compound include ethylidenebiscyclopentadienylhafnium dimethoxide and dimethylsilylbiscyclopentadienylhafnium dimethoxide. Above all, the titanium compounds are preferable.

In addition to these combinations, bidentate coordination complexes such as 2,2'-thiobis(4-methyl-6-t-butylphenyl) titanium diisopropoxide and 2,2'-thiobis(4-methyl-6-t-butylphenyl)titanium dimethoxide can also be used as the component (a).

As the component (b) of the polymerization catalyst, i.e., the coordination complex comprising a cation and an anion in which a plurality of groups are bonded to a metal, various kinds of compounds are usable, but for example, compounds represented by the general formulae (8) and (9) can suitably be used:

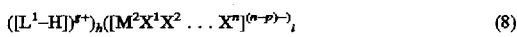

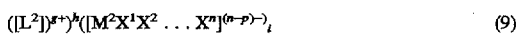

wherein $L^2$ is $M^4$, $T^1T^2M^5$ or $T^3{}_3C$ which will be described hereinafter; $L^1$ is a Lewis base; $M^2$ and $M^3$ are each a metal selected from the groups 5 to 15 of the periodic table; $M^4$ is a metal selected from the groups 8 to 12 of the periodic table; $M^5$ is a metal selected from the groups 8 to 10 of the periodic table; $X^1$ to $X^n$ are each a hydrogen atom, a dialkylamino group, an alkoxy group, an aryloxy group, an alkyl group having 1 to 20 carbon atoms, an aryl group, an alkylaryl group, an arylalkyl group, a substituted alkyl group or a substituted aryl group having 6 to 20 carbon atoms, an organic metalloid group or a halogen atom; $T^1$ and $T^2$ are each a cyclopentadienyl group, a substituted cyclopentadienyl group, an indenyl group or a fluorenyl group; $T^3$ is an alkyl group; p is a valence of each of $M^2$ and $M^3$ and it is an integer of 1 to 7; n is an integer of 2 to 8; g is a valence of each of $L^1$–H and $L^2$ and it is an integer of 1 to 7; h is an integer of 1 or more; and i is h×g/(n−p).

Typical examples of $M^2$ and $M^3$ include atoms such B, Al, C, Si, P, As and Sb, and typical examples of $M^4$ include atoms such as Ag and Cu, and examples of $M^5$ include atoms such as Fe, Co, and Ni. Typical examples of $X^1$ to $X^n$ include dialkylamino groups such as a dimethylamino group and a diethylamino group, alkoxy groups such as a methoxy group, an ethoxy group and an n-butoxy group, an aryloxy groups such as a phenoxy group, a 2,6-dimethylphenoxy group and a naphthyloxy group, alkyl groups having 1 to 20 carbon atoms such as a methyl group, an ethyl group, an n-propyl group, an isopropyl group, an n-butyl group, an n-octyl group and a 2-ethylhexyl group; aryl groups, alkylaryl groups and arylalkyl groups having 6 to 20 carbon atoms such as a phenyl group, a p-tolyl group, a benzyl group, a pentafluorophenyl group, a 3,5-di(trifluoromethyl) phenyl group, a 4-tert-butylphenyl group, a 2,6-dimethylphenyl group, a 3,5-dimethylphenyl group, a 2,4-dimethylphenyl group and a 1,2-dimethylphenyl group, halogens such as F, Cl, Br and I, and organic metalloid groups such as a pentamethylantimony group, a trimethylsilyl group, a trimethylgermyl group, a diphenylarsine group, a dicyclohexylantimony group and a diphenylboron group. Typical examples of the substituted cyclopentadienyl group represented by $T^1$ and $T^2$ include a methylcyclopentadienyl group, a butylcyclopentadienyl group and a pentamethylcyclopentadienyl group.

Of the compounds represented by the general formulae (8) and (9), the following typical compounds can particularly suitably be used. For example, examples of the suitable compounds of the general formula (8) include triethylammonium tetraphenylborate, tri(n-butyl)ammonium tetraphenylborate, trimethylammoniumtetraphenylborate, triethylammonium tetra(pentafluorophenyl)borate, tri(n-butyl)ammonium tetra(pentafluorophenyl)borate and triethylammonium hexafluoroarsenate. Furthermore, examples of the suitable compounds of the general formula (9) include pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra (pentafluorophenyl)borate, ferrocenium tetra (pentafluorophenyl)borate, decamethylferrocenium tetra (pentafluorophenyl)borate, acetylferrocenium tetra (pentafluorophenyl)borate, formylferrocenium tetra (pentafluorophenyl)borate, cyanoferrocenium tetra (pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate and silver tetrafluoroborate.

As the component (b), an aluminoxane can be used in addition to the above-mentioned coordination complex comprising the cation and the anion in which a plurality of groups are bonded to a metal. Here, the aluminoxane can be obtained by bringing an organic aluminum compound into contact with a condensing agent. As a reaction material, an organic aluminum compound represented by the following general formula can be used:

wherein $R^{15}$ is an alkyl group having 1 to 8 carbon atoms. Typical examples of the organic aluminum compound include trimethylaluminum, triethylaluminum and triisobutylaluminum, and above all, trimethylaluminum is most preferable. On the other hand, as the condensing agent for bringing about the condensation with the organic aluminum compound, water is typically used, but any other condensing agent may be used, so far as it permits the condensation reaction of the alkylaluminum. Examples of such an aluminoxane include a chain alkylaluminoxane represented by the general formula (11)

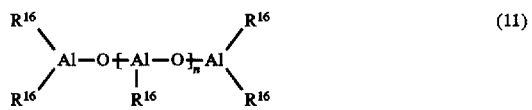

wherein n is a polymerization degree and it is a value in the range of 2 to 50; $R^{16}$ is an alkyl group having 1 to 8 carbon atoms, and a cyclic alkylaluminoxane having a repeating unit represented by the general formula (12)

Of such alkylaluminoxanes, an aluminoxane in which $R^{16}$ is a methyl group, i.e., a methylaluminoxane is particularly preferable. In general, a product obtained by bringing an alkylaluminum compound such as a trialkylaluminum into contact with water is a mixture of the above-mentioned chain alkylaluminoxane or cyclic alkylaluminoxane, the unreacted trialkylaluminoxane and various kinds of condensed products, or a molecule in which these components are complicatedly associated. Accordingly, such a product depends upon the contact conditions of the alkylaluminum compound and water. In this case, no particular restriction is put on the reaction of the alkylaluminum compound and water, and the reaction can be carried out in accordance with a known procedure.

The polymerization catalyst can contain the alkylating agent (c), if necessary. Various kinds of alkylating agents are usable, but for example, there are an alkyl group-containing aluminum compound represented by the general formula (13)

wherein $R^{17}$ and $R^{18}$ are each an alkyl group having 1 to 8 carbon atoms, preferably 1 to 4 carbon atoms; X is a hydrogen atom or a halogen; m is 0<m≦3, preferably 2 or 3, more preferably 3; and n is 0≦n<3, preferably 0 or 1, an alkyl group-containing magnesium compound represented by the general formula (14)

$$R^{17}{}_2Mg \qquad (14)$$

wherein $R^{17}$ is as defined above,
and an alkyl group-containing zinc compound represented by the general formula (15)

$$R^{17}{}_2Zn \qquad (15)$$

wherein $R^{17}$ is as defined above.

Of these alkyl group-containing compounds, the alkyl group-containing aluminum compounds, above all, trialkylaluminum compounds and dialkylaluminum compounds are preferable. Typical examples of the alkyl group-containing compounds include trialkylaluminum compounds such as trimethylaluminum, triethylaluminum, tri-n-propylaluminum, triisopropylaluminum, tri-n-butylaluminum, triisobutylaluminum and tri-t-butylaluminum, dialkylaluminum halides such as dimethylaluminum chloride, diethylaluminum chloride, di-n-propylaluminum chloride, diisopropylaluminum chloride, di-n-butylaluminumchloride, diisobutylaluminum chloride and di-t-butylaluminum chloride, dialkylaluminum alkoxides such as dimethylaluminum methoxide and dimethylaluminum ethoxide, and dialkylaluminum hydrides such as dimethylaluminum hydride, diethylaluminum hydride and diisobutylaluminumhydride. In addition, typical examples of the other alkylating agents include dialkylmagnesium compounds such as dimethylmagnesium, diethylmagnesium, di-n-propylmagnesium and diisopropylmagnesium, and dialkylzinc compounds such as dimethylzinc, diethylzinc, di-n-propylethylzinc and diisopropylzinc.

The polymerization catalyst comprises the above-mentioned components (a) and (b), and if necessary, the component (c), but the preparation of this catalyst can be accomplished by various techniques. For example, any of the components may previously be added to the monomers, or the catalytic components are reacted with each other, prior to the addition of these components to the monomers.

The addition or the contact of the above-mentioned components (a), (b) and (c), needless to say, can be carried out at a polymerization temperature, and it can also be done at a temperature of 0° to 100° C. Furthermore, no particular restriction is put on the addition order or the contact order of the respective components (a), (b) and (c).

The above-mentioned catalyst can exert a high activity in the manufacture of the styrenic polymer having a highly syndiotactic configuration.

In the present invention, the SPS is used in which the amount of an extract extracted with methylene chloride from a gel obtained by purifying, heating and dissolving the SPS in 1,2,4-trichlorobenzene and then cooling the solution is 10% by weight or less, preferably 8% by weight, more preferably 6% by weight. If the extract extracted with methylene chloride is more than 10% by weight, the breaking strength of stretched films and the Izod impact strength and heat deformation temperature of injection-molded articles deteriorate, and the breaking strength under long-term heating and the surface gloss of the molded articles also deteriorate.

No particular restriction is put on the method of preparing the SPS in which the amount of the extract extracted with methylene chloride is inhibited, but for example, there are (1) a method which comprises carrying out a volatilization treatment at the time of the granulation of the SPS by an extruder to volatilize and remove volatile components such as unreacted monomers which remain in the polymer, and (2) a method of suitably selecting the polymerization catalyst for use in the preparation of the SPS.

In the method (1), it is necessary in its volatilization treatment to usually feed 0.01 to 5% by weight, preferably 0.5 to 1.5% by weight of water to a styrenic polymer powder having the syndiotactic configuration which is the material. Alternatively, it is necessary to usually feed 0.1% by weight or more, preferably 0.7 to 5% by weight of an alcohol to the SPS powder. As the technique for feeding water or the alcohol, there may be utilized a way of directly feeding water or the alcohol to the extruder or another way of adding water or the alcohol to the styrenic polymer powder. Furthermore, the styrenic polymer powder may be molten to be plasticized, and water or the alcohol may then be fed to the plasticized polymer. Additionally, in doing the granulation by the use of the extruder having a plurality of vents, volatile components may be volatilized by optional vents on the upstream side of the final vent prior to the feed of water or the alcohol to the polymer. When the granulation is made by a plurality of extruders, the volatile components may be volatilized by optional vents on the upstream side of the final vent of the most downstream extruder prior to the feed of water or the alcohol to the polymer water to be fed may be either of a liquid state and water vapor. Examples of the alcohols include methanol, ethanol, butanol and propanol, and above all, methanol and ethanol are preferable.

As the extruder for use in the above-mentioned volatilization treatment, a vent type extruder having one vent or plural vents can be used, but a monoaxial extruder, an intermeshing type one-directional rotary twin-screw extruder, an intermeshing type extruder and a non-intermeshing type opposite-directional rotary twin-screw extruder may be used singly or in a serial combination of two or more thereof. The pressure in the vent is in the range of 0 to atmospheric pressure, preferably 0 to 200 torr, more preferably 0 to 500 torr. If the pressure in the vent is too high at the time of the volatilization, it is difficult to perform the sufficient volatilization. The granulation is preferably done at a molding temperature in the range of the melting point of the polymer to 400° C. at an extrusion rate which satisfies a relation formula, i.e., the extrusion rate (kg/h)=K×D×H×V wherein K is a constant and it is 167,400, D is a screw diameter (m), H is a screw groove depth (m), V is a screw peripheral speed (m/sec) of 0.1 to 2.0. In the case that a plurality of extruders are connected in series, the above-mentioned extrusion rate means an extrusion rate at the outlet of the most downstream extruder. The screw peripheral speed of the extruder depends upon factors such as the diameter of the screw and a throughput, but for the purpose of enhancing the efficiency of surface renewal at each vent portion, the peripheral speed is preferably in the range of 0.1 to 2.0 m/sec. If the peripheral speed is more than 2.0 m/sec, abnormal heat generation occurs sometimes, and a required power cost also increases inconveniently.

In the present invention, a resin temperature at the granulation is required to be preferably in the range of the melting point of the intended styrenic polymer to 400° C. If the resin temperature is in excess of 400° C., there is a fear that the styrenic polymer decomposes. The preferable temperature is in the range of the melting point to 370° C. At this time, the temperature in the cylinder of the extruder is preferably set to room temperature to 400° C., more preferably a glass transition temperature to 400° C. A shear stress at the extrusion is $1\times10^6$ Pa or less, preferably $5\times10^5$ Pa or less. If the shear stress is too large, melt fracture occurs and so the shape of extruded pellets becomes abnormal sometimes, which will have a bad influence on the following molding step.

Furthermore, in order to heighten the efficiency of the volatilization, an inert gas such as nitrogen, argon, helium or carbon dioxide can be injected.

The above-mentioned method (2) of suitably selecting the polymerization catalyst can be achieved by suitably selecting and combining the above-mentioned polymerization catalysts.

Molded articles of the present invention can be obtained by molding the above-mentioned styrenic polymer (SPS), but some additives can be added to this styrenic polymer to form a composition, so far as the objects of the present invention are not impaired. Examples of the additives include a thermoplastic resin, a rubbery elastomer, an antioxidant, an inorganic filler, a crosslinking agent, a crosslinking auxiliary, a nucleating agent, a plasticizer, a compatibilizer, a colorant and an antistatic agent.

Examples of the above-mentioned thermoplastic resin include a polystyrene having an atactic configuration, a polystyrene having an isotactic configuration, styrenic polymers such as an AS resin and an ABS resin, a polymer ester such as polyethylene terephthalate, polyethers such as polycarbonates, polyphenylene oxides, polysulfones and polyethersulfones, condensed polymers such as polyamides, polyphenylene sulfide (PPS) and polyoxymethylene, acrylic polymers such as polyacrylic acid, polyacrylic esters and polymethyl methacrylates, polyolefins such as polyethylene, polypropylene, polybutene, poly(4-methylpentene-1) and ethylene-propylene copolymer, halogen-containing vinyl polymers such as polyvinyl chloride, polyvinylidene chloride and polyvinylidene fluoride, and mixtures thereof.

As the rubbery elastomer, various kinds of elastomers are usable, and examples of the usable rubbery elastomers include natural rubbers, polybutadienes, polyisoprenes, polyisobutylenes, neoprenes, polysulfide rubbers, Thiokol rubbers, acrylic rubbers, urethane rubbers, silicone rubbers, epichlorohydrin rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene propylene rubbers (EPR), ethylene-propylene-diene rubbers (EPDM), butadiene-acrylonitrilestyrene core shell rubbers (ABS), methyl methacrylate-butadiene-styrene-core shell rubbers (MBS), methyl methacrylate-butyl acrylate-styrene-core shell rubbers (MAS), octyl acrylate-butadiene-styrene-core shell rubbers (MABS), alkyl acrylate-butadiene-acrylonitrile-styrene core shell rubbers (AABS), butadiene-styrene-core shell rubber (SBR), core shell type particulate elastomers, for example, siloxane-containing core shell rubbers such as methyl methacrylate-butyl acrylate siloxane, and rubbers obtained by modifying these rubbers.

Above all, SBR, SBS, SEB, SEBS, SIR, SEP, SIS, SEPS, core shell rubbers and rubbers obtained by modifying these rubbers are particularly preferable.

Furthermore, examples of the modified rubbery elastomers include rubbers obtained by modifying styrene-butyl acrylate copolymer rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene propylene rubbers (EPR) and ethylene-propylene-diene rubbers (EPDM) with a modifier having a polar group. Above all, rubbers obtained by modifying SEB, SEBS, SEP, SEPS, EPR and EPDM are particularly preferable. Typical examples thereof include maleic anhydride-modified SEBS, maleic anhydride-modified SEPS, maleic anhydride-modified EPR, maleic anhydride-modified EPDM, epoxy-modified SEBS and epoxy-modified SEPS.

These rubbery elastomers may be used singly or in a combination of two or more thereof.

As the antioxidant, various kinds of antioxidants can be used, but particularly preferable are phosphorus-containing antioxidants, for example, monophosphites such as tris(2,4-di-t-butylphenyl) phosphite and tris(mono- and di-nonylphenyl) phosphites and diphosphites as well as phenolic antioxidants. Preferable examples of the diphosphites include phosphorus-containing compounds represented by the general formula

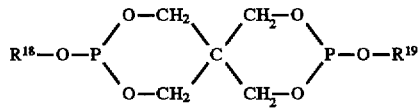

wherein $R^{18}$ and $R^{19}$ are each an alkyl group having 1 to 20 carbon atoms, a cycloalkyl group having 3 to 20 carbon atoms or an aryl group having 6 to 20 carbon atoms.

Typical examples of the phosphorus-containing compounds represented by the above-mentioned general formula include distearylpentaerythritol diphosphite, dioctylpentaerythritol diphosphite, diphenylpentaerythritol diphosphite, bis(2,4-di-t-butylphenyl)pentaerythritol diphosphite, bis(2,6-di-t-butyl-4-methylphenyl) pentaerythritol diphosphite and dicyclohexylpentaerythritol diphosphite.

As the phenolic antioxidants, known compounds can be used, and examples of such known compound include 2,6-di-t-butyl-4-methylphenol, 2,6-diphenyl-4-methoxyphenol, 2,2'-methylenebis(6-t-butyl-4-methylphenol), 2,2'-methylenebis(6-t-butyl-4-methylphenol), 2,2'-methylenebis[4-methyl-6-(α-methylcyclohexyl)phenol], 1,1-bis(5-t-butyl-4-hydroxy-2-methylphenyl)butane, 2,2'-methylenebis(4-methyl-6-cyclohexylphenol), 2,2'-methylenebis(4-methyl-6-nonylphenol), 1,1,3-tris(5-t-butyl-4-hydroxy-2-methylphenyl)butane, 2,2-bis(5-t-butyl-4-hydroxy-2-methylphenyl)-4-n-dodecylmercaptobutane, ethylene glycol-bis[3,3-bis(3-t-butyl-4-hydroxyphenyl) butylate], 1,1-bis(3,5-dimethyl-2-hydroxyphenyl)-3-(n-dodecylthio)butane, 4,4'-thiobis(6-t-butyl-3-methylphenol), 2,3,5-tris(3,5-di-t-butyl-4-hydroxybenzyl)-2,4,6-trimethylbenzene, dioctadecyl 2,3-bis(3,5-di-t-butyl-4-hydroxybenzyl)malonate, n-octadecyl-3-(4-hydroxy-3,5-di-t-butylphenyl) propionate and tetrakis[methylene(3,5-di-t-butyl-4-hydroxy hydrocinnamate)]methane.

In addition to the phosphorus-containing antioxidants and the phenolic antioxidants, amine-containing antioxidants and sulfur-containing antioxidants can also be used singly or in the form of a mixture two or more thereof.

The amount of the antioxidant to be used is usually in the range of 0.0001 to 1 part by weight with respect to 100 parts by weight of the above-mentioned SPS. If the content of the blended antioxidant is less than 0.0001 part by weight, the molecular weight of the styrenic polymer noticeably deteriorates. On the other hand, if it is more than 1 part by weight, mechanical strength is unpreferably affected.

As the inorganic filler, fibrous, granular and powdery fillers are all acceptable. Examples of fibrous inorganic filler include glass fibers, carbon fibers and alumina fibers. On the other hand, examples of the granular and the powdery inorganic fillers include talc, carbon black, graphite, titanium dioxide, silica, mica, calcium carbonate, calcium sulfate, barium carbonate, magnesium carbonate, magnesium sulfate, barium sulfate, oxysulfates, tin oxide, alumina, kaolin, silicon carbide and metallic powders.

No particular restriction is put on the form of molded articles comprising the styrenic polymer of the present invention, and they may be in the form of sheets, films, fibers, nonwoven fabrics, containers, injection-molded articles or blown articles.

The molded articles of the styrenic resin of the present invention can be manufactured by various methods, but, for example, the following method is preferable. That is to say, the above-mentioned SPS or a composition prepared by adding various kinds of components to the SPS as needed is first preliminarily molded to obtain preliminarily molded articles (films, sheets or containers). This molding can be accomplished by extruding the heated and molten molding material into a predetermined form, and the films or the sheets can be molded by T-die extrusion, and the containers or other structures can be molded by injection molding or the like. An extruder which can here be used may be either of a monoaxial extruder and a twin-screw extruder, and it may be equipped with a vent or no vent. No particular restriction is put on the conditions of the extrusion, and they may be suitably selected in compliance with given circumstances. However, it is preferred that a temperature at which the molding material is molten can be selected in the range of from a melting point of the molding material to a temperature 50° C. higher than its decomposition temperature, and shear stress is $5 \times 10^6$ dyne/cm$^2$ or less. Under such conditions, the preliminarily molded articles for a heat treatment having a less rough surface can be obtained.

After the extrusion, the thus preliminarily molded articles for the heat treatment are preferably cooled and solidified thereby. At this time, an optional material such as a gas, a liquid or a metal can be used as a coolant. When a metal roll or the like is used in molding the sheets as the preliminarily molded articles for the heat treatment, a method using an air knife, an air chamber, a touch roll, static application and the like can be utilized, which is effective to prevent the unevenness of thickness and surface waviness. A temperature for the cooling and solidification is usually in the range of 0° C. to a temperature 30° C. higher than the glass transition temperature of the preliminarily molded articles for the heat treatment, preferably in the range of a temperature 70° C. lower than the glass transition temperature to the glass transition temperature. No particular restriction is put on a cooling rate, but it is suitably selected in the range of 200° to 3° C./sec, preferably 200° to 10° C./sec.

The preliminarily molded articles for the heat treatment can take the desired form, but they are usually molded articles such as sheets, films or containers (tubes, trays or the like) having a thickness of 5 mm or less, preferably 3 mm or less. If the preliminarily molded articles for the heat treatment which have not been subjected to the heat treatment yet have a thickness of more than 5 mm, crystallization proceeds inside the articles at the time of the molding of the preliminarily molded articles for the heat treatment to cloud the articles sometimes. Furthermore, the crystallinity of the preliminarily molded articles for the heat treatment is 20% or less, preferably. 15% or less. If the crystallinity of the preliminarily molded articles for the heat treatment is more than 20%, the transparency of the molded articles of the styrenic resin which have been subjected to the heat treatment is poor.

The molded articles of the styrenic resin of the present invention can be obtained, for example, by subjecting the preliminarily molded articles for the heat treatment to the heat treatment in a temperature range of 140° to 180° C., preferably 150° to 170° C. Here, if the heat treatment temperature is less than 140° C., the heat resistance of the obtained articles is not sufficient and the molded articles are clouded on occasion. Conversely, if it is more than 180° C., the transparency becomes insufficient. The time of this heat treatment is usually in the range of 1 second to 30 minutes, preferably 1 second to 10 minutes. At this time, it is preferred that the preliminarily molded articles for the heat treatment is rapidly heated up to the predetermined heat treatment temperature, and therefore, in view of this requirement, a temperature rising rate is 30° C./min or more, preferably 50° C./min or more. If the temperature rising rate is less than 30° C./min, the heat treatment is accomplished at a temperature less than the predetermined heat treatment temperature, so that the transparency of the molded articles of the styrenic resin is impaired sometimes. No particular restriction is put on the heating procedure of the heat treatment, but for example, the heat treatment can be carried out by bringing the molded articles into contact with a heating medium such as a gas, a liquid or a metal at 120° to 200° C. In addition, the molded articles of the styrenic resin which have undergone the heat treatment under the above-mentioned conditions may be subjected to the heat treatment again, if necessary. In this case, the suitable conditions of the heat treatment are that the temperature is in the range of the glass transition temperature to the melting point and the heat treatment time is 1 second or more. In the molded articles of the styrenic resin which have been subjected to the heat treatment again, the improvement of the crystallinity cannot be expected, but a heat deformation temperature can be improved without impairing the transparency.

Next, the present invention will be described in more detail with reference to examples, but the scope of the present invention should not be limited by these examples at all.

Preparation Example 1 (Preparation of a styrenic polymer having a syndiotactic configuration)

In a 500-ml vessel which had been dried and purged with nitrogen were placed 90 μmol of dimethylaniliniumtetra (pentafluorophenyl) borate, 90 μmol of pentamethylcyclopentadienyltitanium tributoxide, 1.8 mmol of triisobutylaluminum and 30 ml of toluene, followed by mixing at room temperature.

Next, in another vessel were placed 250 ml of styrene and 1.40 mmol of triethylaluminum, and the solution was then heated up to 70° C. Afterward, 41.5 ml of the previously prepared catatylst solution was added to the heated solution to carry out polymerization for 1 hour. After the completion of the reaction, the resulting product was dried to obtain 97 g of a syndiotactic polystyrene (SPS). The weight-average molecular weight of this polystyrene was 350,000.

Preparation Example 2 (Preparation of a styrenic polymer having a syndiotactic configuration)

The same procedure as in Preparation Example 1 was repeated except that the amount of triethylaluminum to be used was 2.50 mmol, thereby obtaining 57 g of an SPS. The weight-average molecular weight of this SPS was 220,000.

Preparation Example 3 (Preparation of a styrenic polymer having a syndiotactic configuration)

The same procedure as in Preparation Example 1 was repeated except that 250 ml of styrene was replaced with 225 ml of styrene and 25 ml of p-methylstyrene, thereby obtaining 104 g of a syndiotactic p-methylstyrene-styrene copolymer (the content of p-methylstyrene=7 mol). The weight-average molecular weight of this copolymer was 370,000.

Preparation Example 4 (Preparation of a styrenic polymer having a syndiotactic configuration)

The same procedure as in Preparation Example 1 was repeated except that pentamethylcyclopentadienyltitanium tributoxide was replaced with pentamethylcyclopentadienylzirconium trimethoxide, thereby obtaining 10 g of an SPS. The weight-average molecular weight of this SPS was 200,000.

Incidentally, the methylene chloride extraction of a polymer and the characteristics of molded articles were measured as follows.

(1) Methylene chloride extraction

In 12 ml of 1,2,4-trichlorobenzene was dissolved, at 170° C., 2 g of a polymer obtained by drying, and the solution was then cooled to room temperature to obtain a gel. Next, this gel was subjected to Soxhlet extraction for 4 hours or more by the use of methylene chloride as an extraction solvent, whereby the methylene chloride extraction was determined.

(2) Breaking strength of stretched films

For stretched films, a tensile test was made in an atmosphere at a temperature of 23° C. and a relative humidity of 50%, and breaking strength was evaluated in accordance with JIS-C2318 under conditions that a distance between chucks was set to 100 mm and a test rate was set to 200 mm/min.

(3) Breaking strength of injection-molded articles

A tensile test was made in an atmosphere at a temperature of 23° C. and a relative humidity of 50%, and breaking strength was evaluated in accordance with JIS-K7113 under conditions that a distance between chucks was set to 115 mm and a test rate was set to 5 mm/min.

(4) Surface gloss

Disks having a diameter of 40 mm and a thickness of 3 mm were prepared by injection molding, and gloss was then measured in accordance with JIS-K7105.

(5) Heat treatment of disks

The disks were subjected to a heat treatment at 200° C. for 12 hours, and gloss was then measured in the same manner as described above.

EXAMPLE 1

To an undried polymer which had been polymerized in Preparation Example 1 was added 1.0% by weight of water, and granulation and volatilization were carried out at a cylinder temperature of 290° C. and a molding temperature of 300° to 320° C. at an extrusion rate of 55 kg/hr by the use of a twin-screw extruder. The methylene chloride extraction of the obtained pellets was measured. Next, Irg 1010 (made by Ciba-Geigy) and Adekastab PEP36 (made by Asahi Denka Kogyo K. K.) as antioxidants were blended with the obtained pellets, and a sheet was then extruded through a twin-screw extruder having a T-die at its tip.

A stretched film was prepared from the raw fabric sheet by a successive twin stretching method. At this time, a stretch temperature was 110° C. and a magnification $\lambda_{MD} \times \lambda_{TD}$ was 3×3 wherein $\lambda_{MD}$ was a stretch ratio in a MD direction and $\lambda_{TD}$ was a stretch ratio in a TD direction. Next, the thus stretched film was subjected to 240° C. for 30 seconds at its fixed end.

The breaking strength of the stretched film was measured in the above-mentioned manner. The obtained results are shown in Table 1.

Comparative Example 1

Methanol was added to an undried polymer polymerized in Preparation Example 1 so that the concentration of the styrene-containing polymer might be 98% by weight, and the solution was then stirred at 130° C. for 3 hours in a closed vessel. The resulting polymer was vacuum-dried, and a methylene chloride extraction was measured. Next, a stretched film was prepared, and its breaking strength was then measured. The respective results are shown in Table 1.

TABLE 1

|  | Extraction (wt %) | Breaking Strength (MPa) |
| --- | --- | --- |
| Example 1 | 5.2 | 91 |
| Comp. Ex. 1 | 11.2 | 78 |

EXAMPLE 2

(1) Preparation of maleic anhydride-modified polyphenylene ether 100 parts by weight of a polyphenylene ether (hereinafter referred to as "PPO" sometimes) (its intrinsic viscosity in chloroform at 25° C.=0.45) was dryblended with 3 parts by weight of maleic anhydride, and the blend was molten and kneaded at a set temperature of 300° C. at a screw rotational frequency of 200 rpm by the use of a 30 mm twin-screw extruder. At this time, a resin temperature was about 330° C. The resulting strand was cooled and then pelletized to obtain maleic anhydride-modified PPO.

(2) Preparation of a purified polymer and an injection-molded article

The same granulation and volatilization as in Example 1 were carried out except that an undried polymer polymerized in Preparation Example 2 was used, and a methylene chloride extraction of the resulting pellets was measured. The obtained results are shown in Table 2.

0.3 part by weight of Irg 1010 (made by Ciba-Geigy), 0.3 part by weight of Adekastab PEP36 (made by Asahi Denka Kogyo K. K.) and 0.3 part by weight of TPD (made by Sumitomo Chemical Co. Ltd.) as antioxidants and 0.3 part by weight of PTBBA-A1 (made by Dainippon Ink & Chemicals, Inc) as a nucleating agent were dryblended, by a Henschel mixer, with 100 parts by weight of a mixture obtained by adding 3 parts by weight of maleic anhydride-modified PPO to 100 parts by weight of a composition comprising 90% by weight of the above-mentioned syndiotactic polystyrene and 10% by weight of SEBS (trade name Kraton G-1651, made by Shell Petrochemical Co. Ltd.), and the blend was then kneaded by the use of a twin-screw extruder, while 30% by weight of a glass fiber (trade name ECS03T-051/P, made by Nippon Electric Glass Co., Ltd.) was side-fed, thereby obtaining pellets. Afterward, the obtained pellets were subjected to injection molding to obtain test pieces.

For the thus obtained test pieces and test pieces which had been subjected to a heat treatment at 150° C. for 1,500 hours, breaking strength was measured, and the results are shown in Table 2.

Comparative Example 2

To a polymer polymerized in Preparation Example 4 and then vacuum-dried, methanol was added so that the concentration of the styrene-containing polymer might be 20% by weight, and the solution was then stirred at 130° C. for 1 hour in a closed vessel. This polymer was separated from the solution by filtration, and then vacuum-dried. Afterward, a methylene chloride extraction was measured. Next, an injection-molded article was prepared in the same manner as in Example 2, and breaking strength was then measured before and after a heat treatment. The results are shown in Table 2.

TABLE 2

|  | Extraction (wt %) | Breaking Strength before Heat Treatment (MPa) | Breaking Strength after Heat Treatment (MPa) |
|---|---|---|---|
| Example 2 | 7.7 | 118 | 89 |
| Comp. Ex. 2 | 11.5 | 118 | 70 |

EXAMPLE 3

The pellets of a syndiotactic polystyrene obtained in Example 1 were blended with 0.1% by weight of Irg 1010 (made by Ciba-Geigy) and 0.1% by weight of Adekastab PEP36 (made by Asahi Denka Kogyo K. K.) as antioxidants, and disks were then formed therefrom by injection molding. For the thus formed disk and another disk which was subjected to a heat treatment at 200° C. for 12 hours, gloss was measured. The results are shown in Table 3.

Comparative Example 3

The same procedure as in Example 3 was repeated except that the powder of a syndiotactic polystyrene obtained in Comparative Example 1 was used, thereby forming disks, and gloss was then measured before and after a heat treatment. The results are shown in Table 3.

Comparative Example 4

Methanol was added to an undried polymer polymerized in Preparation Example 3 so that the concentration of the styrene-containing polymer might be 98% by weight, and the solution was then stirred at 130° C. for 3 hours in a closed vessel, followed by vacuum-drying. The methylene chloride extraction of the resulting polymer was measured, and disks were then formed therefrom in the same manner as in Example 3. Next, gloss was measured before and after a heat treatment. The results are shown in Table 3.

TABLE 3

|  | Extraction (wt %) | Breaking Strength before Heat Treatment (MPa) | Breaking Strength after Heat Treatment (MPa) |
|---|---|---|---|
| Example 3 | 5.2 | 92 | 60 |
| Comp. Ex. 3 | 11.2 | 92 | 12 |
| Comp. Ex. 4 | 12.0 | 93 | 12 |

Possibility of Industrial Utilization

As described above, in a styrenic polymer having a highly syndiotactic configuration regarding the present invention, a methylene chloride extraction is extremely small, and this polymer can be used to obtain stretched films having a high breaking strength and to obtain injection-molded articles having a high Izod impact strength, a high heat deformation temperature and a high breaking strength under long-term heating. Furthermore, even if these injection-molded articles are used at a high temperature for a long time, the deterioration of surface gloss can sufficiently be inhibited.

Therefore, the styrenic polymer of the present invention is suitable for the manufacture of sheets such as food wrapping materials, parts for automobiles, building materials, electric and electronic materials, films, fibers and nonwoven fabrics.

We claim:

1. A styrenic polymer having a highly syndiotactic configuration in which the weight-average molecular weight of the styrenic polymer is in the range of $1 \times 10^4$ to $2 \times 10^6$ and in which the weight fraction of an extract extracted with methylene chloride from a gel obtained by dissolving the styrenic polymer in 1,2,4-trichlorobenzene and then cooling the solution is 10% by weight or less.

2. The styrenic polymer having a syndiotactic configuration according to claim 1 wherein the styrenic polymer having the syndiotactic configuration is a homopolymer of styrene or a copolymer of the styrene and a styrenic monomer, an olefin, a diene monomer or a polar vinyl monomer.

3. A molded article comprising a styrenic polymer having a syndiotactic configuration described in claim 1.

* * * * *